(12) United States Patent
Barezzani et al.

(10) Patent No.: US 10,799,962 B2
(45) Date of Patent: *Oct. 13, 2020

(54) WORKING HEAD FOR A COMPRESSION OR CUTTING TOOL

(71) Applicant: Cembre S.p.A., Brescia (IT)

(72) Inventors: Gualtiero Barezzani, Brescia (IT); Gianpaolo Luciani, Brescia (IT)

(73) Assignee: Cembre S.p.A., Brescia (IT)

( * ) Notice: Subject to any disclaimer, the term of this patent is extended or adjusted under 35 U.S.C. 154(b) by 131 days.

This patent is subject to a terminal disclaimer.

(21) Appl. No.: 15/833,648

(22) Filed: Dec. 6, 2017

(65) Prior Publication Data

US 2018/0161889 A1 Jun. 14, 2018

(30) Foreign Application Priority Data

Dec. 9, 2016 (IT) .......................... 102016000124520
Apr. 14, 2017 (IT) .......................... 102017000042136

(51) Int. Cl.
*B23D 29/00* (2006.01)
*B25F 5/00* (2006.01)
(Continued)

(52) U.S. Cl.
CPC ........... *B23D 29/002* (2013.01); *B23D 17/06* (2013.01); *B23D 36/00* (2013.01); *B25B 27/14* (2013.01);
(Continued)

(58) Field of Classification Search
CPC .......... B23D 29/00; B23D 29/002; B25F 5/00
(Continued)

(56) References Cited

U.S. PATENT DOCUMENTS 2,711,583 A * 6/1955 Raby .................... B23D 29/002
 30/228
2,714,250 A * 8/1955 Twedt .................... A01G 3/033
 30/228

(Continued)

FOREIGN PATENT DOCUMENTS

DE 20 2013 003 068 U1 8/2013
WO WO 2016/005838 A1 1/2016
(Continued)

OTHER PUBLICATIONS

Picoup-EXP-240E—"LV-MV Hydraulic Spiking-Cutting Cables Set", SFE (Sibille Fameca Electric), Malataverne, France, Jul. 4, 2014.
(Continued)

*Primary Examiner* — Jason Daniel Prone
(74) *Attorney, Agent, or Firm* — Blank Rome LLP

(57) ABSTRACT

A working head for a hydrodynamic cutting tool includes a working head, an electro-hydraulic pump adapted to increase the pressure of a hydraulic liquid, and a pressure tube connected between the pump and the working head to communicate the pressure of the hydraulic liquid from the pump to the working head. The working head may be removably connectable to the pressure tube and includes two jaws movable, in response to the increase of the hydraulic liquid pressure, between an open position and a closed position to perform the cutting. A cutting detector may be used to detect the completion of the cutting. A cutting confirmation transmitter may be connected to the cutting detector and configured for a wireless transmission of a cutting completion confirmation signal to a cutting confirmation receiver of the cutting tool.

16 Claims, 4 Drawing Sheets

(51) Int. Cl.
*H02G 1/00* (2006.01)
*B23D 36/00* (2006.01)
*B23D 17/06* (2006.01)
*B25B 27/14* (2006.01)
*F15B 11/08* (2006.01)

(52) U.S. Cl.
CPC ............. *B25F 5/005* (2013.01); *H02G 1/005* (2013.01); *F15B 11/08* (2013.01); *F15B 2211/20515* (2013.01)

(58) Field of Classification Search
USPC .......................................... 30/228, 241–243
See application file for complete search history.

(56) References Cited

U.S. PATENT DOCUMENTS

| | | | | |
|---|---|---|---|---|
| 3,041,725 A * | 7/1962 | Harries | ................. | A01G 3/033 30/228 |
| 3,087,530 A * | 4/1963 | Reischer et al. | ... | H01R 43/0427 29/283 |
| 3,135,146 A * | 6/1964 | Loucks | ............. | H01R 43/0428 72/415 |
| 3,230,713 A * | 1/1966 | McDurmont | ...... | H01R 43/0427 60/436 |
| 3,676,929 A * | 7/1972 | Nicholson | ............. | A01K 17/00 30/228 |
| 3,828,431 A * | 8/1974 | Fleming | ................. | A01K 17/00 30/228 |
| 3,840,987 A * | 10/1974 | Netta | ...................... | B21F 11/00 30/241 |
| 3,924,330 A * | 12/1975 | Mitsuhashi et al. | ......................... | B21D 28/002 30/362 |
| 3,995,369 A * | 12/1976 | Duff | ....................... | A01K 17/00 30/228 |
| 4,106,194 A * | 8/1978 | Steed | .................... | A01K 17/00 30/228 |
| 4,174,646 A * | 11/1979 | Kotler | .................... | B25B 23/16 30/241 |
| 4,283,851 A * | 8/1981 | Wolter | ................. | B23D 29/002 30/134 |
| 4,463,496 A * | 8/1984 | Reich | ................... | B23D 29/002 30/180 |
| 4,474,178 A * | 10/1984 | Hyatt | .................... | A01K 17/00 30/228 |
| 4,779,502 A * | 10/1988 | Hebert | ................. | B23D 29/002 30/228 |
| 5,125,158 A * | 6/1992 | Casebolt | ................. | B26B 15/00 30/228 |
| 5,457,889 A * | 10/1995 | Kimura | ............... | B23D 29/002 30/228 |
| 5,465,490 A * | 11/1995 | Smith | .................... | B23D 29/002 30/180 |
| 5,711,078 A * | 1/1998 | Patton | .................... | B26B 15/00 30/182 |
| 5,722,170 A * | 3/1998 | Smith | .................... | H02G 1/005 30/228 |
| 5,992,536 A * | 11/1999 | Shimada et al. | ....... | F15B 21/087 173/4 |
| 6,244,085 B1 * | 6/2001 | Dummermuth | ......... | B25B 27/10 72/31.01 |
| 6,634,173 B2 * | 10/2003 | Linster et al. | ........ | F04B 1/0538 60/484 |
| 6,671,966 B2 * | 1/2004 | Lewis | .................. | B23D 29/002 30/228 |
| 6,792,789 B1 * | 9/2004 | Faucher | ............... | B23D 29/002 72/409.16 |
| 6,986,274 B2 * | 1/2006 | Lefavour | ............. | B23D 29/002 72/453.16 |
| 8,033,025 B2 * | 10/2011 | Maffeis | .................. | B23D 17/06 30/228 |
| 8,074,485 B2 * | 12/2011 | College | .................. | B23D 29/00 100/266 |
| 8,943,699 B2 * | 2/2015 | Strohmeier | ............ | B23D 27/02 30/228 |
| 9,463,556 B2 * | 10/2016 | Lefavour et al. | ........ | B25B 17/00 |
| 2004/0182587 A1 * | 9/2004 | May et al. | .............. | B25B 23/14 173/2 |
| 2006/0212203 A1 * | 9/2006 | Furuno | ................. | E02F 9/2242 701/50 |
| 2010/0269355 A1 * | 10/2010 | Yang | .................... | B23D 29/002 30/228 |
| 2011/0053134 A1 * | 3/2011 | Jung | ........................ | G09B 1/00 434/362 |
| 2014/0157522 A1 * | 6/2014 | Lorini | .................. | B23D 29/023 30/228 |
| 2014/0333525 A1 * | 11/2014 | Gromes, Sr. et al. | .... | G06F 3/01 345/156 |
| 2015/0283693 A1 * | 10/2015 | Chiasson et al. | ..... | B25B 27/146 173/168 |
| 2016/0268068 A1 * | 9/2016 | Chiasson | ................. | H01H 3/20 |
| 2017/0040781 A1 * | 2/2017 | Brown | ...................... | H02G 1/005 |
| 2017/0057040 A1 * | 3/2017 | Rzasa | ...................... | B25F 5/00 |
| 2017/0087709 A1 * | 3/2017 | Barezzani | ............ | B21D 39/048 |
| 2017/0157787 A1 * | 6/2017 | Skinner et al. | ........ | B26D 5/005 |
| 2017/0232624 A1 * | 8/2017 | King | .................. | B26B 21/4056 30/34.05 |
| 2017/0252911 A1 * | 9/2017 | Barezzani | ............... | B25F 5/005 |
| 2017/0252912 A1 * | 9/2017 | Barezzani | ............ | B23D 29/002 |
| 2017/0355027 A1 * | 12/2017 | D-Antuono | ............. | B25B 27/10 |
| 2018/0161890 A1 * | 6/2018 | Barezzani | ............... | B25B 27/14 |
| 2019/0232481 A1 * | 8/2019 | Skinner | .................. | B23D 15/14 |

FOREIGN PATENT DOCUMENTS

| | | |
|---|---|---|
| WO | WO 2016/112153 A3 | 1/2016 |
| WO | WO 2016/112153 A2 | 7/2016 |

OTHER PUBLICATIONS

"Infrared Remote-Controlled Safety Cable Spiking/Cable Cutting System," Specialised Force, Sydney, Australia, Apr. 1, 2015, pp. 1-10.

A. Spafford, "Milwaukee M18 Underground Cable Cutter with Remote," Electrical Tool Reviews, Nov. 8, 2016 pp. 1-2.

* cited by examiner

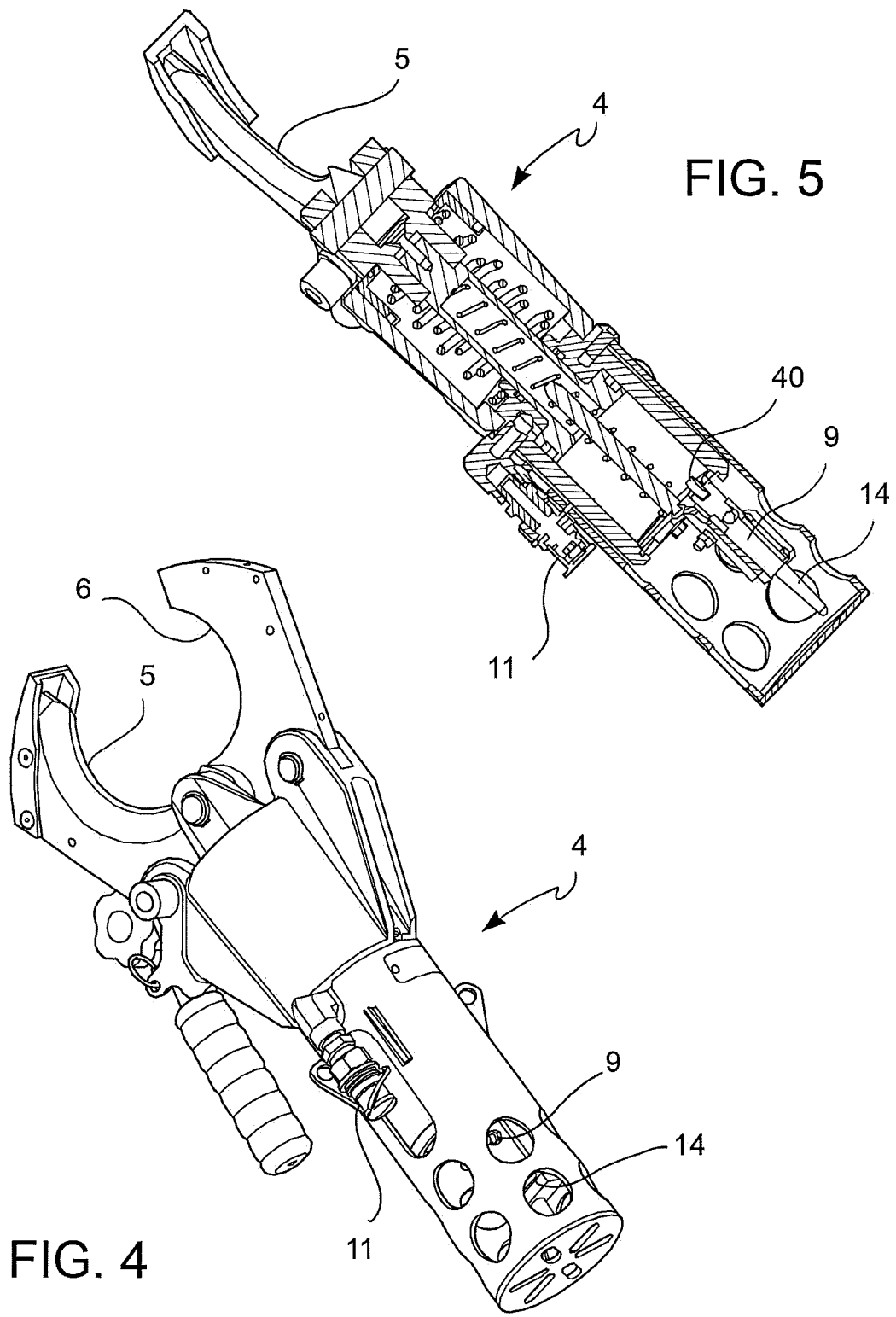

US 10,799,962 B2

WORKING HEAD FOR A COMPRESSION OR CUTTING TOOL

BACKGROUND OF THE INVENTION

Field of the Invention

The present invention relates to a head for cutting electric wires by means of a hydrodynamic cutting tool.

Description of the Related Art

Hydrodynamic cutting tools are often used to perform given cutting operations, e.g. the cutting of electric wires, during electric system installation and maintenance.

Such tools comprise an electric motor and a hydraulic pump which causes an increase of a hydraulic liquid pressure operating on a piston to move the latter against the bias of a pressure spring. In turn, the piston is connected to a movable jaw so as to displace it, during the compression operation, with respect to a fixed jaw of the tool. The jaws may be shaped and/or provided with interchangeable accessory elements, so as to adapt to a particular object, e.g. a metallic conductor to be cut.

Most cutting operations, in particular those performed on electric cables, are hindered by very narrow space conditions and are performed in conditions (of risk due to live electric conductors) which are potentially very dangerous for the operator and harmful for the tools. Consequently, the need is felt to configure the cutting tool so as to reach the electric cable to be cut easily and, at the same time, to reduce the risk of injury to the operator and to limit potential damage to the tool itself.

A further need is that of being able to perform and control the result of the cutting operations with appropriate rapidity in order to reduce the time needed to perform the job.

A further need is to have cutting heads with specific jaws, suited for a specific cutting operation and to be able to use different cutting heads in versatile manner with different pumps or tool bodies.

SUMMARY OF THE INVENTION

It is thus the object of the present invention to provide a working head (cutting head) for cutting electric cables or the like with a hydrodynamic cutting tool having features such to solve at least some of the drawbacks mentioned with reference to the prior art.

These and other objects are achieved by means of a working head according to claim 1. The dependent claims relate to advantageous embodiments.

According to an aspect of the invention, there is suggested a working head for a hydrodynamic cutting tool of the type comprising:

a working head,
an electro-hydraulic pump adapted to increase the pressure of a hydraulic liquid,
a pressure tube connected between the pump and the working head so as to communicate the pressure of the hydraulic liquid from the pump to the working head, wherein the working head can be removably connected to the pressure tube and comprises:

two jaws, which can be displaced, in response to the increase of the hydraulic liquid pressure, between an open position and a closed position to perform the cutting,
a cutting detector configured to detect the completion of the cutting,
a cutting confirmation transmitter connected to the cutting detector and configured for a wireless transmission of a cutting completion confirmation signal to a cutting confirmation receiver of the cutting tool.

BRIEF DESCRIPTION OF THE DRAWINGS

In order to understand the invention and better appreciate its advantages, the description of some embodiments will be provided below by way of non-limiting examples with reference to the figures, in which:

FIG. 4 is a perspective view of a working head for a cutting tool, according to a further embodiment, FIG. 5 is a longitudinal section view of the working head in FIG. 4.

DETAILED DESCRIPTION OF THE PREFERRED EMBODIMENTS

Figure 1:
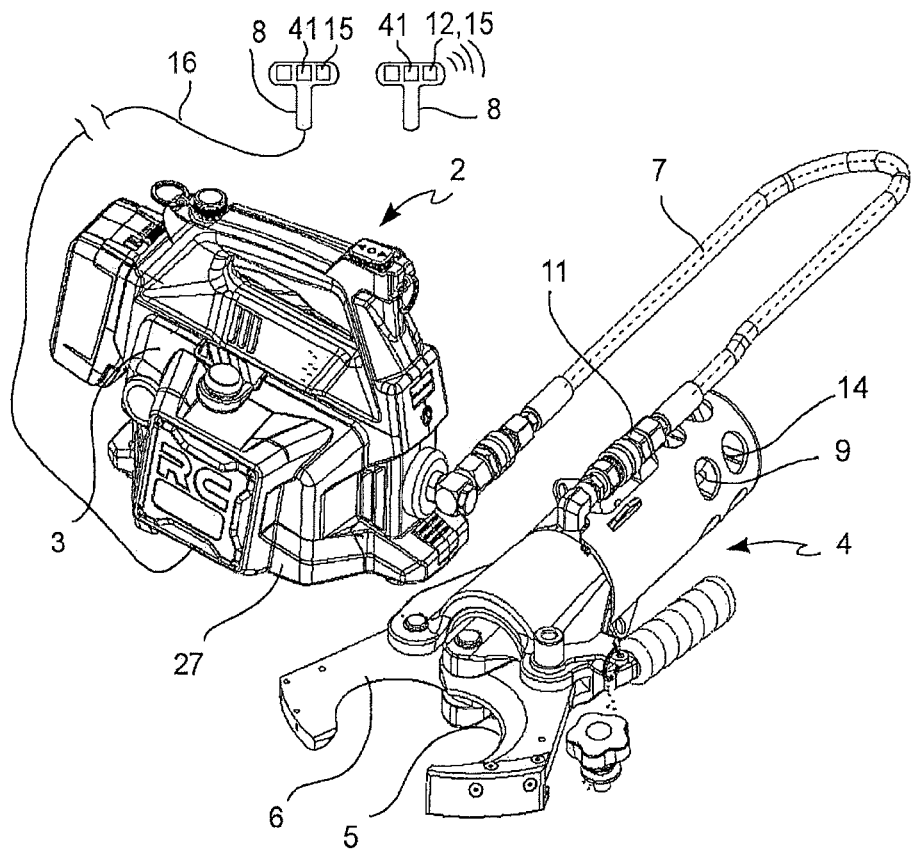
FIG. 1 is a perspective view of a cutting tool with a hydraulic pump and with a working head according to an embodiment.

The figures show a working head 4 for a hydrodynamic cutting tool 2 of the type comprising a working head 4, an electro-hydraulic pump 3 adapted to increase the pressure of a hydraulic liquid, a pressure tube 7 connected between the pump 3 and the working head 4 to communicate the pressure of the hydraulic liquid from the pump 3 to the working head 4.

According to an aspect of the invention, the working head 4 is removably connected to the pressure tube 7 and comprises two jaws 5, 6 which can be displaced, in response to the increase of the pressure of the hydraulic liquid, between an open position and a closed position to perform the cutting, a cutting detector 9 configured to detect the completion of the cutting, a cutting confirmation transmitter 14 connected to the cutting detector 9 and configured for a wireless transmission of a cutting completion confirmation signal to a cutting confirmation receiver 15 of the cutting tool 2.

By virtue of the configuration of the working head 4 as an accessory removably connectable to the pressure tube 7, the head itself may be used with different, either flexible or rigid, pressure tubes 7, of different length, so as to facilitate use in very narrow space conditions.

The cutting detector 9 mounted directly on the working head 4, and thus specifically configured for this working head 4, makes it possible to control the result of the cutting operations with an appropriate speed in order to be able to proceed safely to the next step of working and to be able to stop the hydraulic fluid pressurization in a timely manner, thereby reducing the energy consumption (battery) and extending the working life of the mechanically stressed components.

The cutting completion confirmation signal may be used, either directly or indirectly, to switch off the pump 3, for opening a valve which prevents a further pressurization of the hydraulic fluid and/or for an acoustic signal to the tool user 2.

By virtue of the fact that the cutting detector 9 and the wireless cutting confirmation transmitter 14 are connected to each other and both connected directly to the working head 4, they may be optimized for the specific working head configuration and type and still provide a standardized cutting completion confirmation signal, which can be received by a cutting confirmation receiver 15 of the tool 2, e.g. aboard the pump 3 or aboard a remote controller 8, which can be interpreted by an electronic control board 32 of the tool 2. This makes it possible to use a plurality of different and interchangeable working heads 4 with the same pump 3 and vice versa.

The wireless transmitter 14 aboard the working head 4 allows a complete electric isolation of the working head 4 (the only component in direct contact with the electric conductor to be cut) from the pump 3 and from the user, and constitutes a very versatile signal communication interface which does not require any physical signal connector, e.g. USB connectors, on the working head 4, on the pressure hose 7, or on the pump 3.

Furthermore, thanks to the wireless transmitter 14 on the work head 4, the need to integrate an electric signal conductor in the pressure pipe 7 is avoided.

Advantageously, the pressure flexible tube 7 and the hydraulic liquid are electrically insulating and the working head 4 is electrically isolated from the pump 3. Furthermore, the pump 3 and the heads 4 are connected to a ground connection. This protects the pumping assembly from high voltage if live cables are cut (by mistake).

Detailed Description of the Cutting Completion Signal Communication Transmission System The cutting confirmation transmitter 14 and the cutting confirmation receiver 15 together provide a wireless cutting confirmation connection of the tool 2.

According to an embodiment, the cutting confirmation transmitter 14 is connected to the cutting detector 9 and mounted on the working head 4, and the cutting confirmation receiver 15 can be connected to, and preferably mounted on or housed on or in a remote controller 8 of the pump 3 or directly connected to a control electronics 32 of the pump 3 and preferably mounted or housed on or in the pump 3.

The cutting confirmation transmitter 14 and the cutting confirmation receiver 15 are preferably wireless radio wave, or alternatively infrared radiation or laser, transmitters/receivers and/or transceivers.

The direct wireless transmission between the cutting detector 9 and the remote control 8 or control electronics 32 of the pump 3 is fast and requires a minimum number of transmission components.

According to an alternative embodiment, the cutting confirmation receiver 15 may be mounted or housed on an intermediate reception station, materially separate from the pump 3 and/or from the remote control 8 and freely positionable in an intermediate position between them or independent from them.

According to an advantageous embodiment, the cutting completion signal is also automatically transmitted to the control electronics 32 of the pump 3 which controls the completion and termination of the working cycle (cutting cycle) according to the cutting completion signal.

In particular, the control electronics of the pump 3, once cutting completion is confirmed (which corresponds to reaching the closed position of the jaws 5, 6=first working cycle interruption criterion), automatically interrupts the further pressurization of the hydraulic fluid, in particular, deactivates pump 3. This avoids an unnecessary further increase of the pressure of the hydraulic fluid, of the mechanical stress of the head and the electric power consumption of the battery, once the cutting has already been completed, until a maximum pressure is reached which causes the opening of a maximum pressure valve (second working cycle interruption criterion) or until predetermined operating condition combinations occur.

According to the embodiments, the transmission of the cutting completion confirmation signal to the control electronics 32 of the pump 3 may be performed:

by the remote control 8 by means of an electric or optical transmission cable or by means of a wireless actuation transmitter 12 aboard the remote control 8 and an actuation receiver 13 aboard the pump 3 and connected to the control electronics 32 of the pump 3, and/or directly by the cutting confirmation transmitter 14 to the cutting confirmation receiver 15 aboard the pump 3 and connected to the control electronics 32 of the pump 3.

Alternatively or additionally, the transmission of a pumping interruption command to the control electronics 32 of the pump 3 may be brought about by the operator, in non-automatic manner, by means of manual actuation (of a button) of the remote control 8, and with the help of the actuation transmitter 12 and of the actuation receiver 13.

The described transmitters and receivers are connected to the control electronics of the modules with which they are associated and can be controlled by the control electronics in a known manner and therefore not described in detail. Furthermore, the described transmitters and receivers can be separate devices and dedicated only to the described functions. This allows the use of low-cost, commercially available, wireless transmission systems, in particular wireless radio transmission, and optimized for certain functions, such as a push-switch displacement sensor with the switch pushing confirmation radio transmitter aboard and with a dedicated radio receiver, of small size and low cost.

Alternatively, the described transmitters and receivers can be made by using more versatile transmitters, receivers or transceivers which perform a plurality of the described wireless transmission and reception features.

Detailed Description of the Pump 3

According to an embodiment, the pump 3 comprises a pump housing 27, an accumulator seat 28 adapted to receive an accumulator 29 and having electric terminals which constitute an electric contact with the accumulator 29, an electric motor 30 supported by the pump housing 27 and which can be fed by means of the accumulator 29, a hydro-dynamic assembly 31 (pumping assembly) supported by the pump housing 27 and connected to the electric motor 30 so as to increase the pressure of the hydraulic liquid, in response to the movement of the electric motor 30, as well as the aforesaid electronic control circuit 32 connected to the electric motor 30 and to the accumulator 29 for controlling the electric motor 30.

The hydrodynamic pump 31 comprises a tank 33, a pumping cylinder-piston assembly and a maximum pressure valve 34.

The pumping cylinder-pump assembly may comprise a pumping cylinder with an intake opening connected to the tank 33 by means of a check valve, which allows the flow of hydraulic oil from the tank 33 into the pumping cylinder, and a discharge opening in communication with the flexible pressure tube 7 and, consequently, with an actuating cylinder 35 of the working head 4. A check valve is arranged in the discharge opening to allow the flow of hydraulic oil from the pumping cylinder towards the actuating cylinder 35, but not the other way. In the pumping cylinder there may be accommodated a pumping piston coupled so as to translate together with a pivoting member actuated by the electric motor 30.

The maximum pressure valve 34 may be arranged in a return pipe 36 which connects the actuating cylinder 35 to the tank 33.

In this manner, the actuation of the electric motor 30 operates the hydrodynamic assembly 31 (pumping assembly) and moves the jaws 5, 6 from the open position towards or into the closed position until a predetermined maximum calibration pressure is reached in the actuating piston 35. When the maximum calibration pressure is reached, the maximum pressure valve 34 automatically opens the fluid return pipe 36 to discharge (at least part of) the pressure liquid from the actuating cylinder 35 into the tank 33.

Detailed Description of the Working Head 4

The working head 4 may comprise a body 37 with the actuating cylinder 35 which receives an actuating piston 38 which can be displaced by the pressurized fluid.

The working head 4 further comprises the two jaws 5, 6 connected to the body 37 in mutually movable manner and connected to the actuating piston 38 so that, in response to the displacement of the actuating piston 38, the jaws 5, 6 perform a relative movement between an open position and a closed position to perform the cutting.

A return spring 39 acts on the actuating piston 38 so as to elastically bias it to a rest position, in which the jaws 5, 6 are in the open position.

The working head 4 can be removably connected to the pressure tube 7, e.g. by means of a hydraulic connector 11. Alternatively or additionally, the pressure flexible tube 7 may be removably connected to the pump housing 27.

So, the working head 4 may be configured as an accessory, which can be operatively coupled to and uncoupled from the pump 3, and which is exchangeable.

The pressure tube 7 may be a short and rigid tube so that the working head 4 can be removably coupled in a position immediately bordering with the pump housing 27. Alternatively, the pressure tube 7 may be an elongated tube (and possibly flexible, as shown in the figures) and extended externally to the pump housing 27 so that the working head 4 can be removably coupled in a position away (distanced) from the pump housing 27.

Detailed Description of the Cutting Detector 9

The cutting detector 9 is connected to the working head 4 so as to detect the arrival of one or both cutting jaws 5, 6 in the closed position or the arrival of the actuating piston 38 in the limit stop position corresponding to the closed position of the jaws 5, 6. The cutting detector may comprise an electromechanical sensor, e.g. a position switch, an optical switch, a magnetic proximity sensor, a contact sensor or a potentiometer.

Advantageously, the cutting detector 9 comprises a movable member 40, which is displaced (by at least one of the jaws 5, 6 or by the actuating piston 38) when the closed position of the jaws 5, 6 is reached and a part of the displacement energy of the movable member 40 is used to energize and actuate the cutting confirmation transmitter 14. The movable member may be displaced either by an actuating piston or rod or by at least one of the jaws. Preferably, a further part of the displacement energy of the movable member 40 is accumulated for the reception, by the cutting confirmation transmitter 14, of a confirmation signal (from the cutting confirmation receiver 15, 15') that the first cutting confirmation signal was received and, in the negative case, to repeat the transmission of the cutting confirmation signal.

The need for an electric battery for the cutting detector 9 is avoided in this manner.

In this embodiment, the cutting confirmation transmitter 14 and the cutting confirmation receiver 15, 15' are configured as transceivers.

Figures 2, 3:
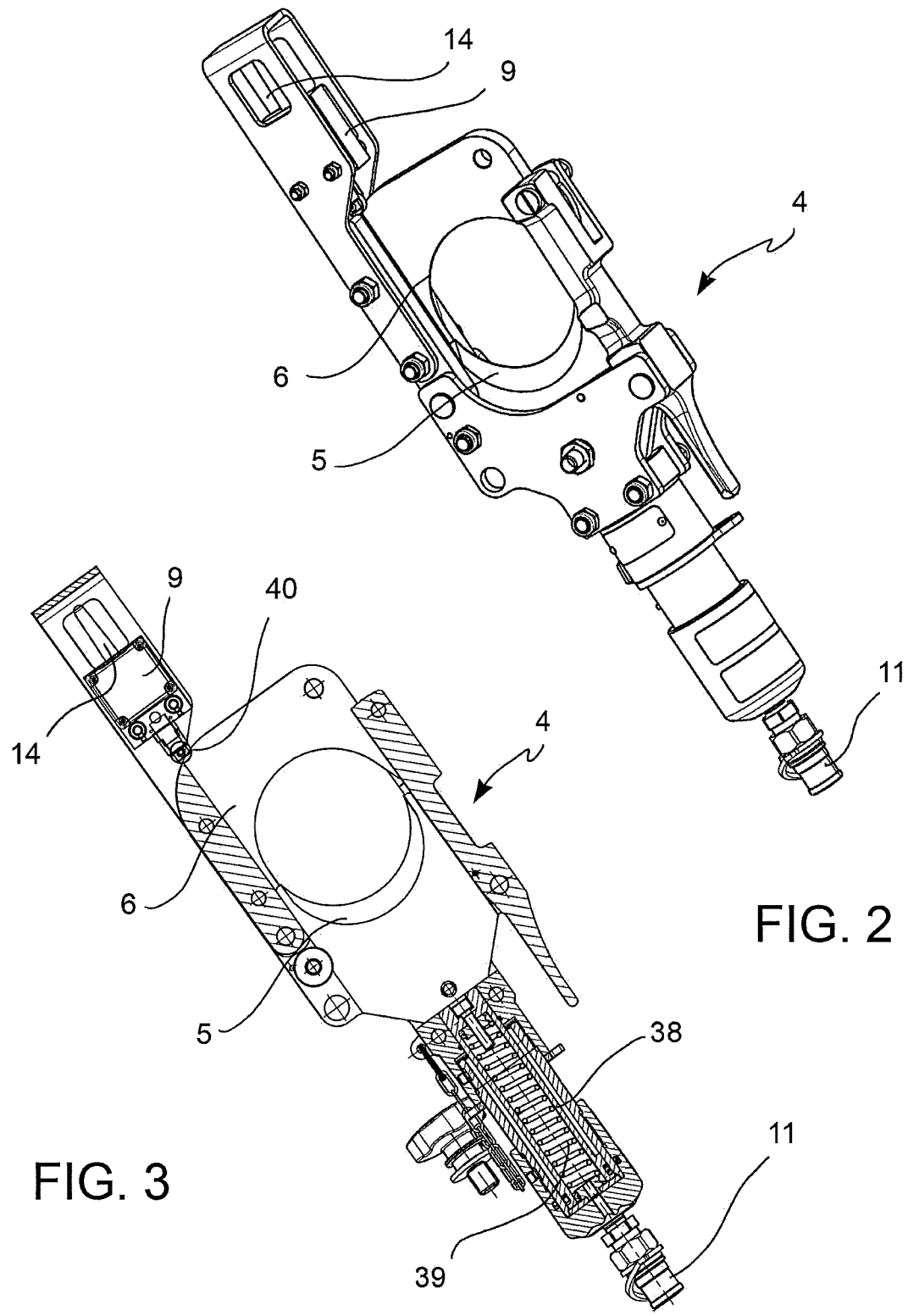
FIG. 2 is a perspective view of a working head for a cutting tool, according to an embodiment.
FIG. 3 is a longitudinal view of the working head in FIG. 2.
Figure 7:
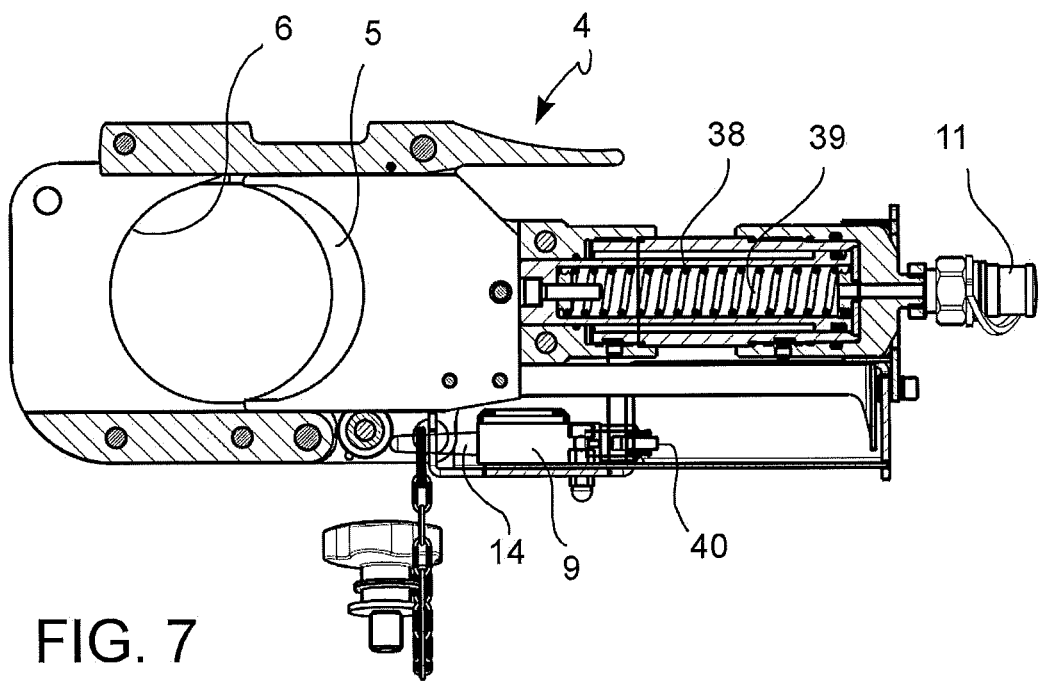
FIGS. 7 and 8 are perspective and longitudinal section views of a working head according to an embodiment.
Figure 8:
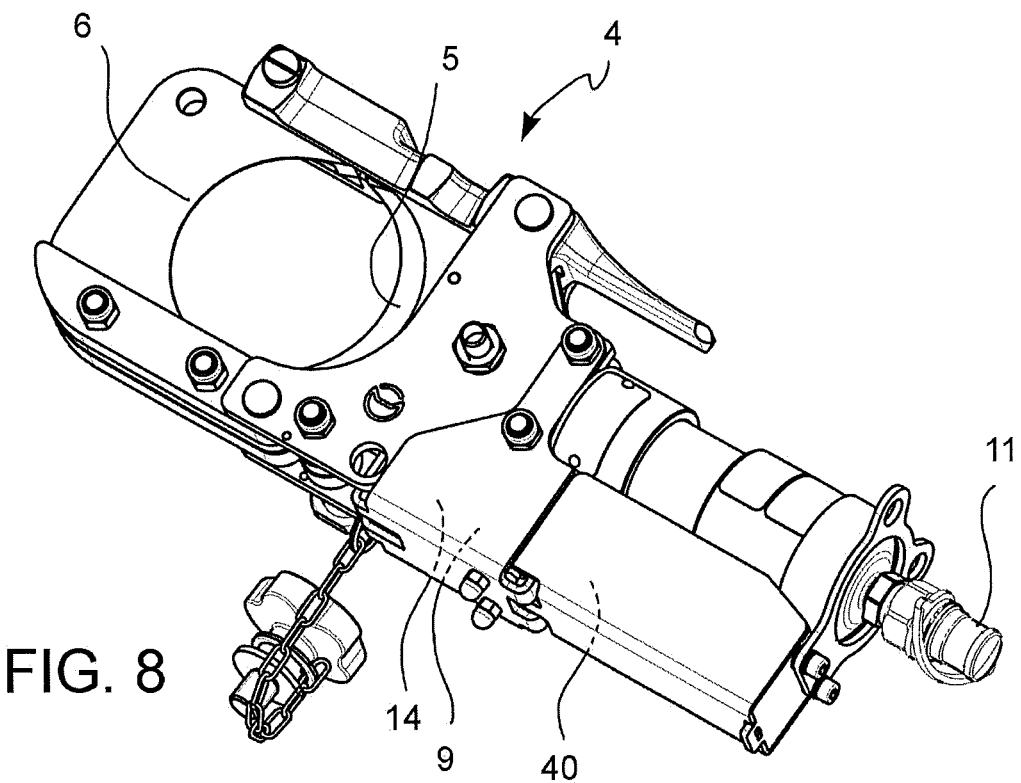

In the embodiment in FIGS. 2 and 3, the cutting detector 9 and the cutting confirmation transmitter 14 are arranged on a front side of the working head 4 opposite to the side of the hydraulic connector 11, while in the embodiment shown in FIGS. 7 and 8, the cutting detector 9 and the cutting confirmation transmitter 14 are arranged laterally next to one of the jaws 5, 6 and to the actuating cylinder 35 and the movable member 40 can be engaged and moved by means of a transmission bar connected to a movable jaw 5 of the jaws 5, 6. In the embodiment in FIGS. 4 and 5, the cutting detector 9 and the cutting confirmation transmitter 14 are arranged on a rear side of the working head 4 facing the extension direction of the pressure tube 7 of the cutting head 4.

Detailed Description of the Hand-Held Remote Control 8

The hand-held remote control 8 comprises a control panel 41 for manually switching on and off (the electric motor 30 of) the pump 3.

In an embodiment, the control panel 41 also allows the manual selection of an operating mode of the pump 3 from a plurality of preset operating modes, and the hand-held remote control 8 may comprise a display which shows the selected operating mode and/or the operating parameters and/or information on the cutting execution state.

The remote control 8 is in signal connection with the pump 3 via an electric or optical transmission cable 16 or by means of a wireless actuation transmitter 12 aboard the remote control 8 and an actuation receiver 13 aboard the pump 3 and connected to the control electronics 32 of the pump 3.

Alternatively or additionally, a control panel which allows to manually switch on and off (of the electric motor 30) of the pump 3 may be provided also or only on the housing 27 of the pump 3.

Figure 6:
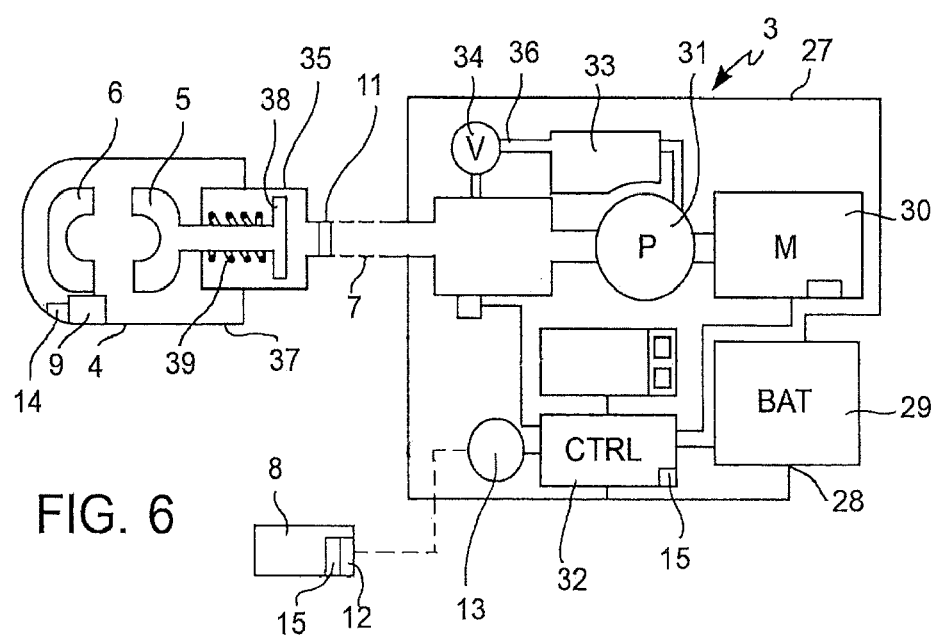
FIG. 6 is a diagrammatic representation of the cutting tool according to an embodiment.

In an embodiment, the working head 4 may comprise compression jaws instead of the described cutting jaws 5, 6, and thus be adapted to compress cables or electric connections or other workpieces with the same methods described with reference to the cutting of cables. The cutting detector 9 and the cutting completion signals described herein will act respectively as compression sensor and as a compression completion signal. FIG. 6 shows jaws that operate in compression.

The technical problem described in the introduction and the technical effects and advantages described with respect to the cutting of electric wires similarly apply to the compression of electric connections and/or connectors, potentially in contact with live electric cables, and also to the compression of hydraulic connections and/or connectors, in particular in the case of pressurized pipes and/or of inflammable, explosive or highly corrosive fluid pipes.

What is claimed is:

1. A working head for a hydrodynamic cutting tool, wherein the hydrodynamic cutting tool includes an electrohydraulic pump adapted to increase pressure of a hydraulic liquid, and a pressure tube connected between the pump and the working head to communicate the pressure of the hydraulic liquid from the pump to the working head, wherein the working head can be removably connected to the pressure tube, and wherein the working head comprises:

two jaws, at least one of which is displaced in relation to the other of the jaws, in response to an increase of the hydraulic liquid pressure, between an open position and a closed position to perform a cutting operation, a cutting detector configured to detect completion of the cutting operation, and a cutting confirmation transmitter connected to the cutting detector and configured for a wireless transmission of a cutting completion confirmation signal to a cutting confirmation receiver, and wherein the cutting detector includes a movable member which is displaced by the at least one jaw when the closed position is reached, and wherein movement of the movable member energizes and actuates the cutting confirmation transmitter.

2. A working head according to claim 1, wherein the cutting confirmation transmitter is selected in the group consisting of a radio wave transmitter, an infrared radiation transmitter, a laser transmitter.

3. A working head according to claim 1, comprising a body with an actuating cylinder which accommodates an actuating piston displaceable by means of the pressurized liquid, wherein the two jaws are connected to the body in mutually movable manner, and connected to the actuating piston so as to perform, in response to the displacement of the actuating piston, said movement between the open position and the closed position.

4. A working head according to claim 3, wherein the cutting detector is connected to the working head so as to detect arrival of the actuating piston in a travel limit position corresponding to the closed position of the jaws.

5. A working head according to claim 1, wherein the cutting detector comprises a sensor chosen from the group constituted by:
    an electromechanical sensor,
    a position switch,
    an optical sensor,
    a magnetic proximity sensor,
    a contact sensor,
    a potentiometer.

6. A working head according to claim 1, wherein the cutting confirmation transmitter is configured to receive a confirmation signal from the cutting confirmation receiver that the cutting completion confirmation signal was received, and to repeat transmission of the cutting completion confirmation signal if the confirmation signal from the cutting confirmation receiver is not received.

7. A working head according to claim 6, wherein the cutting confirmation transmitter is configured as a transceiver.

8. A working head according to claim 1, wherein the cutting detector is free from electric battery.

9. A working head for a compression or cutting tool, said working head comprising:
    two jaws, at least one of which is displaced in relation to the other of the jaws between an open position and a closed position to perform a compression operation or a cutting operation,
    a compression or cutting detector configured to detect completion of the compression operation or of the cutting operation, and
    a compression or cutting confirmation transmitter connected to the compression or cutting detector and configured for a wireless transmission of a compression or cutting completion confirmation signal to a compression or cutting confirmation receiver of the compression or cutting tool, and
    wherein the compression or cutting detector includes a movable member which is displaced by the at least one jaw when the closed position is reached, and wherein movement of the movable member energizes and actuates the compression or cutting confirmation transmitter.

10. A working head according to claim 9, wherein the compression or cutting confirmation transmitter is chosen from a group constituted by a radio wave transmitter, an infrared radiation transmitter, a laser transmission.

11. A working head according to claim 9, wherein the compression or cutting detector is connected to the working head so as to detect arrival of an actuating piston in an end-of-stroke position corresponding to the closed position of the jaws.

12. A working head according to claim 9, wherein the compression or cutting detector comprises a sensor chosen from the group constituted by:
    an electromechanical sensor,
    a position switch,
    an optical sensor,
    a magnetic proximity sensor,
    a contact sensor,
    a potentiometer.

13. A working head according to claim 9, wherein the compression or cutting confirmation transmitter is configured to receive a confirmation signal from the compression or cutting confirmation receiver that the compression or cutting completion confirmation signal was received, and to repeat transmission of the compression or cutting completion confirmation signal if the confirmation signal from the compression or cutting confirmation receiver is not received.

14. A working head according to claim 13, wherein the compression or cutting confirmation transmitter is configured as a transceiver.

15. A working head according to claim 9, wherein the compression or cutting detector has no electric battery.

16. A hydrodynamic cutting tool comprising:
    a working head according to claim 1,
    an electro-hydraulic pump adapted to increase pressure of a hydraulic liquid, said pump having control electronics in signal connection with the cutting confirmation receiver,
    a pressure tube connected between the pump and the working head to communicate the pressure of the hydraulic liquid from the pump to the working head,
    wherein:
    the cutting completion confirmation signal is automatically transmitted to the control electronics of the pump via the cutting confirmation receiver,
    the control electronics ends the cutting operation according to the cutting completion confirmation signal.

* * * * *